US011609207B2

(12) United States Patent
McAuliffe et al.

(10) Patent No.: US 11,609,207 B2
(45) Date of Patent: Mar. 21, 2023

(54) ELECTROCHEMICAL SENSOR AND METHOD OF FORMING THEREOF

(71) Applicant: Analog Devices International Unlimited Company, Limerick (IE)

(72) Inventors: Donal McAuliffe, Limerick (IE); Rizwan Gill, Limerick (IE); Alfonso Berduque, Crusheen (IE); Shane Geary, Sixmilebridge (IE); Raymond J. Speer, Dalkey (IE)

(73) Assignee: Analog Devices International Unlimited Company, Limerick (IE)

( * ) Notice: Subject to any disclaimer, the term of this patent is extended or adjusted under 35 U.S.C. 154(b) by 430 days.

(21) Appl. No.: 16/836,060

(22) Filed: Mar. 31, 2020

(65) Prior Publication Data

US 2021/0302359 A1    Sep. 30, 2021

(51) Int. Cl.
*G01N 27/404*    (2006.01)
*G01N 27/407*    (2006.01)

(52) U.S. Cl.
CPC ....... *G01N 27/4076* (2013.01); *G01N 27/404* (2013.01); *G01N 27/4077* (2013.01)

(58) Field of Classification Search
CPC .......................... G01N 27/404; G01N 27/4045
See application file for complete search history.

(56) References Cited

U.S. PATENT DOCUMENTS

| | | |
|---|---|---|
| 4,900,405 A | 2/1990 | Otagawa et al. |
| 5,727,548 A | 3/1998 | Hill et al. |
| 5,858,452 A * | 1/1999 | Leader ............... G01N 33/4925 427/124 |
| 6,242,683 B1 | 6/2001 | Raeisaenen et al. |
| 6,361,390 B1 | 3/2002 | Sreeram et al. |
| 6,440,296 B1 | 8/2002 | Stanzel et al. |
| 6,605,483 B2 | 8/2003 | Victor et al. |
| 6,695,964 B1 | 2/2004 | Ando et al. |
| 7,256,497 B2 | 8/2007 | Kameyama et al. |
| 8,231,766 B2 | 7/2012 | Hayashi et al. |

(Continued)

FOREIGN PATENT DOCUMENTS

| | | |
|---|---|---|
| CN | 102387746 | 3/2012 |
| CN | 108538892 | 9/2018 |

(Continued)

OTHER PUBLICATIONS

EPO computer-generated English language translation of the Description section of Belda et al. WO 2010/149153 A1, patent published Dec. 29, 2010 (Year: 2010).*

(Continued)

*Primary Examiner* — Alexander S Noguerola
(74) *Attorney, Agent, or Firm* — Schwegman Lundberg & Woessner, P.A.

(57) ABSTRACT

Electrochemical sensors can include at least two electrodes, over which an electrolyte is formed. The electrodes can be isolated from one another in order for reduction/oxidation reactions to occur at the electrodes and for an electric current to flow therebetween. The present disclosure describes the use of a barrier in the electrochemical sensor that is configured to isolate electrodes from one another for the purpose of preventing electrode shorting. Additionally, the physical structure of the barrier can also act as a stencil for shaping the electrodes.

20 Claims, 14 Drawing Sheets

(56) References Cited

U.S. PATENT DOCUMENTS

| | | | |
|---|---|---|---|
| 9,453,815 B2 | 9/2016 | Nakagawa et al. | |
| 10,488,362 B2 | 11/2019 | Laurenson | |
| 10,620,151 B2 | 4/2020 | Berduque et al. | |
| 2010/0025238 A1 | 2/2010 | Gottlieb et al. | |
| 2010/0155239 A1* | 6/2010 | Sorensen | G01N 33/4925 |
| | | | 204/406 |
| 2011/0100811 A1 | 5/2011 | Eckhardt et al. | |
| 2012/0178091 A1 | 7/2012 | Glezer et al. | |
| 2012/0181184 A1 | 7/2012 | Whitesides et al. | |
| 2014/0322906 A1 | 10/2014 | Levy et al. | |
| 2015/0001076 A1* | 1/2015 | Porro | G01N 27/4045 |
| | | | 216/18 |
| 2016/0231251 A1 | 8/2016 | Ou et al. | |
| 2017/0238991 A1 | 8/2017 | Worrell et al. | |
| 2018/0059044 A1* | 3/2018 | Berduque | G01N 27/4045 |
| 2019/0128835 A1 | 5/2019 | Pratt et al. | |
| 2019/0317042 A1 | 10/2019 | Mu et al. | |

FOREIGN PATENT DOCUMENTS

| | | | |
|---|---|---|---|
| EP | 0810431 | 12/1997 | |
| EP | 3480589 A1 * | 5/2019 | G01N 27/404 |
| GB | 2337485 | 11/1999 | |
| WO | 2005075995 | 8/2005 | |
| WO | WO 2010149153 A1 * | 12/2010 | G01N 27/407 |
| WO | 2014030129 | 2/2014 | |
| WO | 2018048362 | 3/2018 | |
| WO | WO/2021/197815 | 10/2021 | |
| WO | WO-2021197815 A1 | 10/2021 | |

OTHER PUBLICATIONS

Online Merriam-Webster dictionary defintion of "stencil" downloaed Jul. 29, 2022 from https://www.merriam-webster.com/dictionary/stencil (Year: 2022).*

Online Merriam-Webster dictionary defintion of "receive" downloaed Jul. 29, 2022 from https://www.merriam-webster.com/dictionary/stencil (Year: 2022).*

"International Application Serial No. PCT/EP2021/056475, International Search Report dated Jun. 30, 2021", 5 pgs.

"International Application Serial No. PCT/EP2021/056475, Written Opinion dated Jun. 30, 2021", 8 pgs.

George, Paul M, "Fabrication of Screen-Printed Carbon Electrode Arrays for Sensing Neuronal Messengers", Biomecal Microdevices, 3(4), Kluwer Academic Publishers, NL, (2001), 307-313.

* cited by examiner

ELECTROCHEMICAL SENSOR AND METHOD OF FORMING THEREOF

FIELD OF THE DISCLOSURE

The present disclosure relates to an electrochemical sensor having a barrier. The present disclosure also relates to a method of forming such an electrochemical sensor having a barrier.

BACKGROUND

Electrochemical gas sensors can include a substrate upon which two or more electrodes and an electrolyte reside. An example of such a sensor is disclosed in the applicant's co-pending application U.S. Ser. No. 15/251,833 which is incorporated herein by reference. The electrodes or the electrolyte are exposed to the natural environment by one or more holes or pores provided in a portion of the housing. For example, a plurality of capillaries may be provided in a substrate upon which the electrodes and electrolyte are formed. When certain gases enter the device via the openings, an electrochemical reaction occurs which may be sensed by connections to the electrodes.

SUMMARY OF THE DISCLOSURE

Electrochemical sensors typically include at least two electrodes, over which an electrolyte is formed. The electrodes must be isolated from one another in order for reduction/oxidation reactions to occur at the electrodes and for an electric current to flow therebetween. The present disclosure proposes the use of a barrier in the electrochemical sensor (hereinafter also referred to as the "device") that is configured to isolate electrodes from one another for the purpose of preventing electrode shorting. Additionally, the physical structure of the barrier can also act as a stencil for shaping the electrodes.

In accordance with a first aspect of the disclosure, there is provided an electrochemical sensor, comprising: a substrate having one or more gas transmission openings formed therein, the openings arranged to allow gases to pass through the substrate; two or more electrodes; a barrier for the two or more electrodes; and an electrolyte formed over the barrier and the two or more electrodes, wherein the barrier is configured to isolate at least part of one electrode from part of another electrode.

The barrier is a physical barrier that prevents at least part of an electrode from flowing into other areas of the semiconductor device. In particular, the barrier acts to prevent at least part of an electrode from flowing into part of another electrode, in which case shorting would occur between the two electrodes. The barrier also acts as an electrical barrier between two electrodes; it can be made of a material that is electrically insulating, for example, a polymer such as polyimide or a photoresist such as SU8. The barrier material is preferably also photodefinable so that it can be easily printed onto a substrate or upper layer of the device, or can be etched after depositing.

Aside from preventing the electrodes from shorting out, another advantage that the barrier provides is allowing for the electrodes to be printed closer together than in a device without the barriers, and thus smaller and cheaper sensors can be manufactured. The barriers also allow the use of higher viscosity inks for printing the electrodes since they isolate the electrodes from one another and so they prevent the flow of electrode ink from one electrode to another.

The two or more electrodes are formed in a pattern over an upper surface of the electrochemical sensor, wherein the upper surface may be an insulating layer, a conductive track, an adhesive layer or a passivation layer. One or more protrusions can also be formed over an upper layer of the electrochemical sensor and they can be formed at least between the two or more electrodes so as to be configured to act as barriers to prevent the two or more electrodes from contacting one another.

By "over", it will be appreciated that this refers to the orientation of the electrochemical sensor as shown in the figures, rather than the orientation of the electrochemical sensor in use.

In order to isolate at least part of one electrode from part of another electrode, a maximum height of the barrier may be at least equal to a maximum height of the two or more electrodes, and preferably the maximum height of the barrier can be at least twice the maximum height of the two or more electrodes. In such a configuration, the height of the barrier acts as a physical barrier to prevent parts of one electrode from flowing into part of another electrode.

The barrier height may range from 10 um to 200 um. The height required can be determined by the thickness of the electrodes that needs to be isolated or separated and also the proximity of the electrodes when printed. In some examples, the barrier may be at least 25 μm in height. Alternatively, the barrier may be at least 50 μm in height.

For further robustness of the barrier, the barrier may be configured to be well-shaped, having two peaks enclosing a dip, the two peaks preferably being spaced apart by at least 0.02 millimetres. In other words, the barrier may be double-walled. A lowest height of the dip may be at least equal to the maximum height of the two or more electrodes. In the event that a part of one electrode overflows over an inner wall of the barrier, it may reside between the two walls of the barrier, i.e. in the dip, and is prevented from flowing over the outer wall of the barrier.

The electrochemical sensor may further comprise an upper insulating layer having one or more openings configured to receive the two or more electrodes. The upper insulating layer may be, for example, a passivation layer. The barrier may be arranged over the insulating layer. In some alternative examples, the barrier may be formed integrally with the passivation layer. The barrier may preferably be configured to also receive the two or more electrodes, such that the two or more electrodes are at least partly defined by the barrier.

An outer perimeter of a barrier for an electrode may be built up as an additional layer around an opening in the upper insulating layer and then the electrode can formed within the barrier and within the opening of the upper insulating layer. Alternatively, the barrier may be formed as a "tub" within the opening in the upper insulating layer and an electrode may be screen-printed or deposited into the tub. The walls of the tub prevent overflow of electrode into other areas of the electrochemical sensor or another electrode. As an alternative to creating the barrier in an additive process, the barrier could be formed by a removal process, for example, etching the upper insulating layer such that the resulting patterned upper insulating layer forms the barrier.

In photolithography or screen-printing techniques for printing electrodes, a stencil is often required for outlining the shape of the electrodes. However, in the above cases, the barrier may act as a stencil for forming the two or more electrodes, and there is no need for a separate stencil.

The barrier may be arranged to surround at least one electrode. Preferably, the barrier may be arranged to surround and outline each part of the electrode. The barrier may also be arranged substantially between at least two electrodes in order to isolate part of the two or more electrodes from one another. Preferably, the barrier is arranged between the electrodes so as to fully isolate each part of the two electrodes from one another.

The electrochemical sensor may further comprise a cap for housing the electrolytes. The barrier may also be formed to align with protrusions on the cap such that, in use, the barriers also act to contain or house the electrolyte. When the barrier is made of an adhesive or a bonding material, they may also be used to attach the cap to an upper surface of the electrochemical sensor. Barriers may also be provided outside and/or surrounding at least one electrode in order to protect the electrode from the cap.

In accordance with a second aspect of the disclosure there is provided an electrochemical sensor, comprising: a substrate having one or more gas transmission openings formed therein, the openings arranged to allow gases to pass through the substrate; two or more electrodes formed in a pattern over an upper surface of the electrochemical sensor; one or more protrusions also formed over the upper surface of the electrochemical sensor and formed at least between the two or more electrodes; an electrolyte formed over the barrier and the two or more electrodes, wherein the one or more protrusions are configured to act as barriers to prevent the two or more electrodes from contacting one another.

As with the first aspect, the one or more protrusions act as physical barriers to prevent the two or more electrodes from contacting one another by preventing at least part of an electrode from flowing into part of another electrode, which would result in shorting of the electrodes. The barrier also acts as an electrical barrier between two electrodes.

The upper surface may be an insulating layer, a conductive track, an adhesive layer or a passivation layer. In one example, the barrier may be built around an opening in the insulating layer that has been etched away.

In accordance with a third aspect of the disclosure there is provided a method of forming an electrochemical sensor, the method comprising the steps of: providing a substrate having one or more gas transmission openings, the openings arranged to allow gases to pass through the substrate; forming a barrier for two or more electrodes; forming two or more electrodes; forming an electrolyte over the barrier and the two or more electrodes, wherein the barrier is configured to isolate at least part of one electrode from part of another electrode.

Again, as with the first and second aspects, by forming barriers that are configured to isolate at least part of one electrode from part of another electrode, shorting between the electrodes is avoided. The barrier also acts as an electrical barrier between two electrodes.

Typically, the barrier may be formed over an upper layer of the electrochemical sensor by adding layers, or by removing or etching away layers. Some examples of these two processes are discussed as follows.

In order to process a barrier on an upper surface of the substrate by adding layers, a photo-definable polymer may be applied. This could be spun on or it could be laminated. The polymer is defined using a photolithography process. In order to create the barriers in the substrate by removing layers, a pattern may be applied to the substrate first to define "tubs". This can also be done using a photolithography process. The tubs in the substrate can then be etched away using a dry or wet etch. The mask for the etching process could be a resist polymer or it may be a hard mask such as an oxide. The tubs in the substrate may be lined with an insulating layer such as an oxide in order to isolate the electrode to be filled in the tubs from a conductive substrate such as silicon.

In the method of providing a barrier between electrodes in an electrochemical sensor, the method may further comprise one or more of the following steps:
  forming the barrier using photolithography, lamination or deposition in an additive process;
  forming the barrier using etching in a removal process;
  forming an upper insulating layer having one or more openings configured to receive the two or more electrodes;
  arranging the barrier over the upper insulating layer;
  configuring the barrier to also receive the two or more electrodes, such that two or more electrodes are at least partly defined by the barrier;
  forming a maximum height of the barrier to be at least equal to a maximum height of the two or more electrodes, and preferably forming the maximum height of the barrier to be at least twice the maximum height of the two or more electrodes;
  forming the barrier to be between 10-200 μm in height;
  forming the barrier to be at least 25 μm in height;
  forming a wall of the barrier to be well-shaped with two peaks enclosing a dip, the two peaks preferably being spaced apart by at least 0.02 mm;
  forming a lowest height of the dip is at least equal to the maximum height of the two or more electrodes;
  arranging the barrier to surround at least one electrode; and
  arranging the barrier substantially between at least two electrodes.

In each of the above examples, advantages associated with one aspect of the disclosure may also be associated with another aspect of the disclosure if appropriate.

BRIEF DESCRIPTION OF THE DRAWINGS

Examples of the present disclosure will now be described by non-limiting example only, with reference to the accompanying drawings, in which.

DETAILED DESCRIPTION

During manufacture, an electrochemical sensor may be filled with a suitable electrolyte. The electrolyte sits over the electrodes so as to facilitate current flow between the electrodes. However, when the electrode overspills into areas of the electrochemical sensor that is not within its predefined region, or when one electrode overspills and contacts another electrode, electrical shorting occurs, causing the operation of the electrochemical sensor to potentially fail.

In the present disclosure, a part of one electrode is isolated from part of another electrode by a barrier, which prevents the two electrodes from contacting one another. Therefore, electrical shorting between the electrodes is avoided and the electrochemical sensors utilising such barriers are much more stable over their working lifetime.

A barrier is an obstacle that keeps apart or prevents movement across two areas. In the context of the present electrochemical sensor, the barrier is both a physical barrier and an electrical barrier between at least two electrodes. Therefore, the barrier can be made of an electrically insulating material, for example, a polymer such as polyimide or a photoresist such as SU-8. The barrier material is preferably also photodefinable so that it can be easily printed onto a substrate or upper layer of the device, or can be etched after depositing.

The barrier may comprise one or more protrusions formed in a pattern over an upper surface of the electrochemical sensor, the protrusions receiving the electrodes. The upper surface may be an insulating layer, a conductive track, an adhesive layer or a passivation layer. The one or more protrusions can be formed at least between the two or more electrodes so as to be configured to act as barriers to prevent the two or more electrodes from contacting one another.

Figure 1:
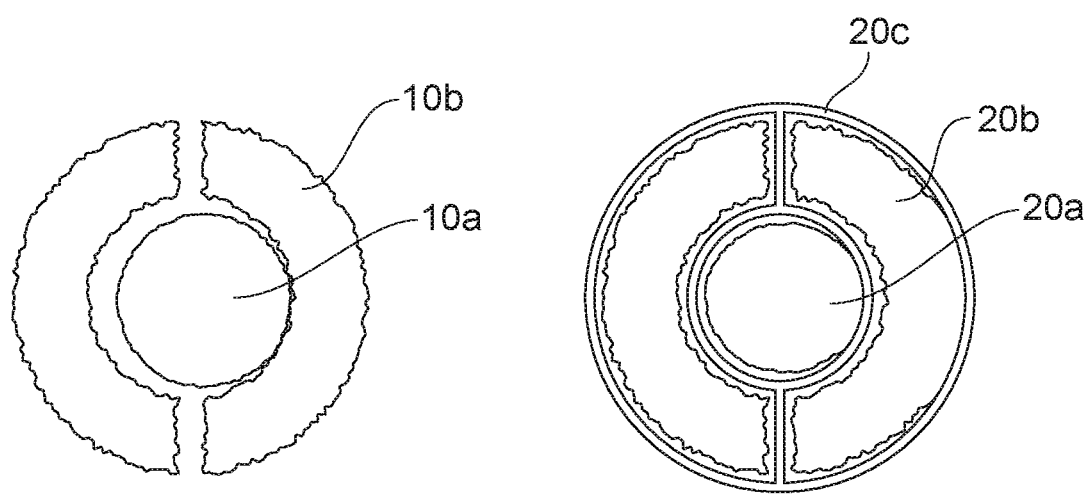
FIG. 1 is a schematic view of screen-printed electrodes.

The problem of electrical shorting is illustrated in FIG. 1, in which electrodes 10A and 10B are shown to contact one another. When inks from the two electrodes flow into one another, beyond their own predefined areas, electrical shorting occurs and detection of oxidation and reduction of gas within the electrochemical sensor breaks down. In contrast, electrodes 20*a* and 20*b* are printed neatly within their predefined areas due to the presence of a barrier 20*c* and so the oxidation and reduction of gas within the electrochemical sensor invokes current flow between electrodes 20*a* and 20*b*, thus allowing efficient operation of the electrochemical sensor.

The electrochemical sensor may have two or more electrodes. Typically, at least two electrodes are provided; a working electrode and a counter electrode. The potential difference, current flow or resistance between these electrodes may be measured in order to determine whether a gas has entered through openings in the substrate of the device. Sometimes, a third electrode, known as a reference electrode, is also provided. The reference electrode is held at a constant potential with respect to the working electrode. The presence of substances which interact with the working electrode/electrolyte interface can invoke current flow between the working electrode and the counter electrode as a result of reduction/oxidation reactions at the working electrode. Additional electrodes such as a diagnostics electrode and/or a second working electrode, etc. may also be incorporated.

Figure 2A:
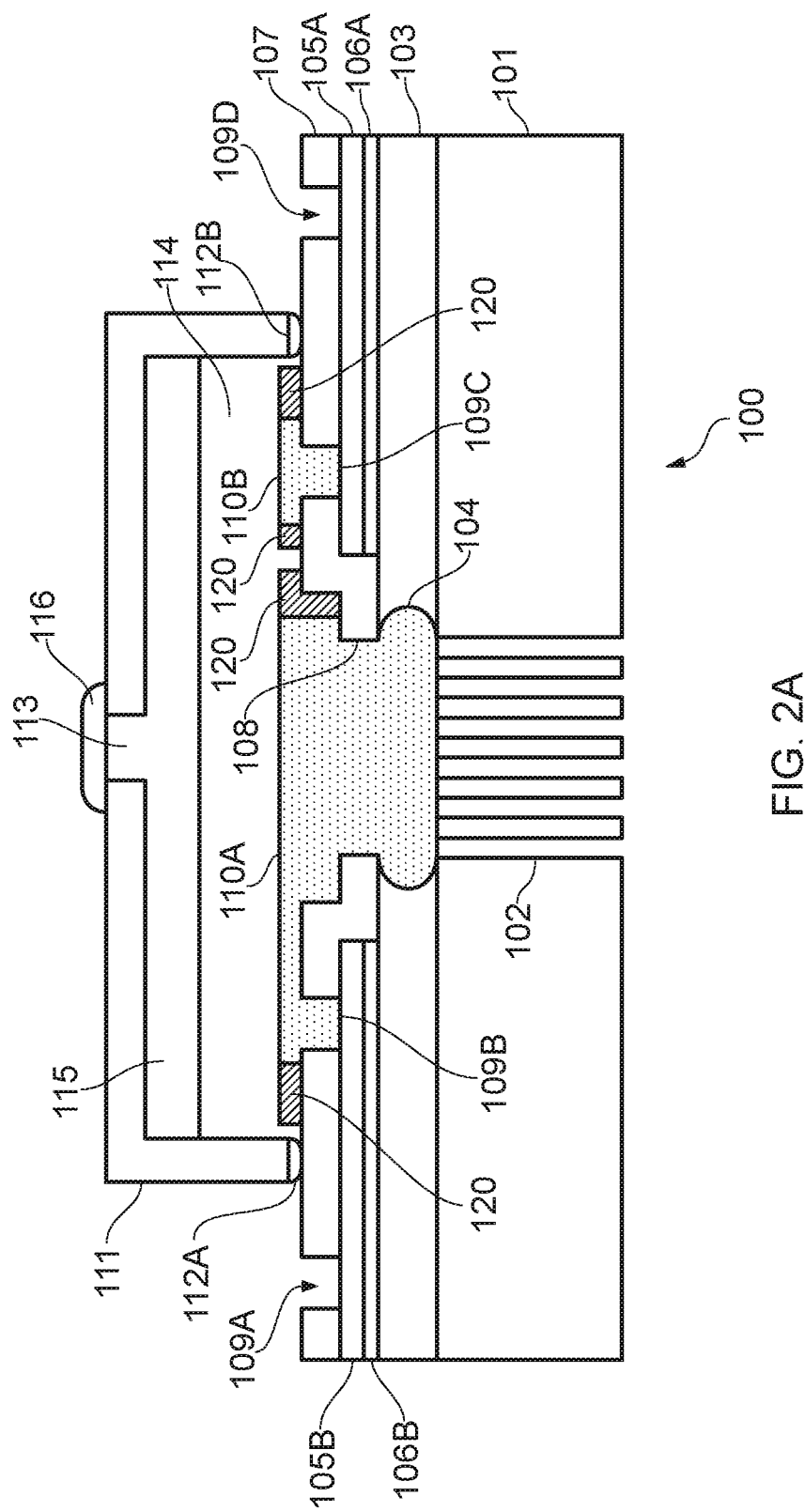
FIG. 2A is a cross-sectional view of an electrochemical sensor in accordance with a first example of the disclosure.

FIG. 2A shows a cross-section through an electrochemical sensor 100 formed on silicon using micromachining techniques in accordance with a first example of the disclosure. An example of such a sensor is disclosed in the applicant's co-pending application U.S. Ser. No. 15/251,833 which is incorporated herein by reference. The electrochemical sensor is formed on a silicon substrate 101. In this example, a single sensor is formed on the silicon substrate 101. However, in practice, several sensors may be formed on a single substrate, in a similar manner to the way in which multiple integrated circuits may be formed on a single silicon substrate. As an alternative to silicon, the substrate may be made from glass, ceramic or plastic. A plurality of microcapillaries 102 are formed in the substrate 101. In FIG. 2A, six microcapillaries are shown in cross-section. However, the microcapillaries 102 are also formed across the width of the substrate, and there may be typically ten or more microcapillaries, or a single microcapillary. Each microcapillary is formed in a direction orthogonal to the surface of the substrate 101, and extends from an upper surface to a lower surface of the substrate. Each microcapillary is approximately 20 μm in diameter, although each microcapillary may be in the range of 1 μm to 2 mm in diameter. The group of microcapillaries 102 is approximately 1 mm across, but may be in the range of 0.001 mm to 3 mm across.

An insulating layer 103 is formed on the upper surface of the substrate 101. The insulating layer 103 may be formed from silicon oxide (SiO2) and is approximately 4 μm thick. An electrode opening 104 is formed in the insulating layer 103 in a position that is aligned with the microcapillaries 102. The opening is described as being aligned in the sense that the microcapillaries are formed in an area defined by the opening in the insulating layer. The walls of the opening 104 are not necessarily precisely aligned with the walls of the microcapillaries. In this example, the opening 104 is approximately circular, but may be square or rectangular. The opening 104 may be 1 to 2 mm across. The side walls of the opening 104 are straight in shape. However, it will be appreciated that the side walls may be semi-circular or may be formed from any other shape that increases the surface area of the side walls.

Conductive tracks 105A, 105B are formed on a top surface of the insulating layer 103. The conductive tracks 105A, 105B are adhered to the insulating layer 103 by an adhesion layer 106A, 106B. The conductive tracks 105A, 105B may be made of gold or any other suitable conductive material. For example, the conductive tracks may be made from metal or conductive plastic. The conductive tracks are arranged such that they stop approximately 25 µm from the edge of the opening 104. The tracks may stop anywhere between a few microns to a few millimeters from the edge of the opening. The conductive tracks 105A, 105B are for connecting the electrodes to external circuit elements. The conductive tracks may extend into the opening formed in the insulating layer 103. Additionally the conductive tracks may extend into the capillaries in order to improve contact resistance.

A passivation layer 107 is formed over the insulating layer 103 and the conductive tracks 105A, 105B. An opening 108 is formed in the passivation layer 107. The opening 108 is the same size as the electrode opening 104, and is aligned with the opening 104. Additional holes 109A, 109B, 109C, 109D are formed in the passivation layer to allow connections to be made between the electrodes (discussed below) and external circuit elements. Additional holes may be added for sensors with more than two electrodes.

As FIG. 2A shows a cross-section through the sensor 100, only a working electrode 110A and a counter electrode 110E are shown. The working electrode 110A is formed in the openings 104 and 108. The electrode completely fills the openings 104 and 108 and abuts the top surface of the substrate 101.

The working electrode 110A extends approximately 25 µm above the top of the passivation layer 107. The working electrode 110A also extends into hole 109B. This provides an electrical connection to conductive track 105B, allowing connections to external circuit elements via hole 109A. A counter electrode 110B is formed in hole 109C. Counter electrode 110E also extends 25 µm above the passivation layer 107. The counter electrode 110B also extends into hole 109C. This provides an electrical connection to conductive track 105A, allowing connections to external circuit elements via hole 109D. The electrode 110A is printed directly on the microcapillaries 102. As such, the electrolyte 114 may be liquid. The electrode 110A prevents the electrolyte 114 passing through the microcapillaries. The electrodes are porous and are made of a catalyst, such as platinum. The electrode 110A thus provides the 3-phase porous surface required for the chemical reactions to take place. The catalyst is a medium to high surface area porous catalyst, such as platinum black. Sufficient catalyst is provided to ensure sufficient catalytic activity throughout the sensor's lifetime. The catalyst may also be one of platinum, gold, ruthenium, carbon black or iridium. Other appropriate materials may be used.

A barrier 120 is provided for the electrodes 110A, 110B, wherein the barrier 120 is configured to isolate the electrodes 110A, 110B from one another. The barrier 120 is a physical barrier that prevents at least part of an electrode from flowing into other areas of the semiconductor device. In particular, the barrier forms a pattern of protrusions above the passivation layer 107 and acts to prevent at least part of an electrode from flowing into part of another electrode and contacting the other electrode, in which case shorting would occur between the two electrodes. The barrier 120 also acts as an electrical barrier between two electrodes; it can be made of a material that is electrically insulating. In the example of FIG. 2A, the barrier 120 is made of polyimide, which is photodefinable so that it can be easily printed onto a substrate or upper layer of the device 100, or can be etched after depositing.

Aside from preventing the electrodes 110A, 110B from shorting out, another advantage that the barrier 120 provides is allowing for the electrodes to be printed closer together than in a device without the barriers, and thus smaller and cheaper sensors can be manufactured. The barrier 120 also allows the use of higher viscosity inks for printing the electrodes since they isolate the electrodes 110A, 110E from one another and so they prevent the flow of electrode ink from one electrode to another.

In FIG. 2A, in order to isolate the electrodes 110A, 110B from one another, a maximum height of the barrier 120 is equal to a maximum height of the electrodes 110A, 110B. In such a configuration, the height of the barrier 120 acts as a physical barrier to prevent parts of one electrode from flowing into part of another electrode. The barrier height may range from 10 µm to 200 µm, but in the specific example of FIG. 2A, the barrier height is 25 µm in height.

The barrier 120 is built up as an additional layer around an opening in the passivation layer 107 and then the electrodes 110A, 110B are formed within the barrier 120 and within the opening of the passivation layer 107. In standard photolithography techniques for printing electrodes 110A, 110B, a stencil is often required for outlining the shape of the electrodes 110A, 110B. However, in FIG. 2A, the barrier 120 acts as a stencil for forming the two electrodes 110A, 110B, and there is no need for a separate stencil.

A cap 111 is formed over the electrodes 110A, 110B. In embodiments where additional electrodes are used, the cap 111 would also be formed over those electrodes. The cap may be formed from glass, ceramic, silicon or plastic. The cap 111 is sealed to the passivation layer 107 by epoxy/adhesive or frit glass 112A, 112B. Other bonding techniques may be used. A hole 113 is formed in the top of the cap 111. An electrolyte 114 is provided within the cap 111. In another aspect, two or more holes may be formed in the cap 111. This would enable the electrolyte to be vacuum filled. Alternatively, the electrolyte can be dispensed using a jetter dispensing nozzle through a fill hole and the air inside the cavity can be displaced through a vent hole. The electrolyte 114 may be made from a liquid solution, such as a conductive aqueous electrolyte or organic electrolyte, a conductive polymer, such as Nafion or PEDOT:PSS. The electrolyte may also be a hydrogel or a room temperature ionic liquid. In one example, the electrolyte may be sulfuric acid solution and may include a wicking material or wicking substructure. The electrolyte may be a two-layer electrolyte. The electrolyte 114 completely covers the electrodes, but when using liquid electrolytes, does not completely fill the cap 112. Instead, a void space 115 is left towards the top of the cap 111. The void space 115 may not be required when using conductive polymer electrolytes, hydrogels and some other non-aqueous electrolytes. Epoxy glue or a sealing tape 116 (or any other organic polymeric material) is formed over the hole or holes 113 to prevent or restrict any pollutants entering the cap, and also to prevent or restrict the electrolyte 114 from leaving the cap. Other options may be utilized for sealing. If two holes are provided in the cap 111, a seal may be formed over both holes. In another aspect, a larger hole could be covered with an adhered lid, once the cavity is filled.

If the cap 111 is made from plastic, the plastic material must be compatible with the electrolyte 114. Various plastic materials may be used. For example, the cap may be made from acrylonitrile butadiene styrene (ABS), PTFE, polycarbonate (PC), polyethylene (PE), polydimethylsiloxane (PDMS), amongst other plastics. Important properties of the plastic are its chemical resistance and its compatibility with the electrolytes.

In FIG. 2A, the conductive tracks 105A, 105B are provided over the insulating layer 103. The openings 109A, 109D are provided outside of the cap 111 in order to allow the sensor to be connected to external devices. It may be preferable to omit the portion of the substrate 101 and insulting layer 103 that extend outside of the cap 111, in order to reduce the size of the sensor 100. In order to facilitate this, the conductive tracks may be omitted, and conductive vias may be formed through the substrate instead. This would enable connections to be made on the underside of the substrate 101. Additionally, the size of the substrate 101 may be reduced to the size of the cap 111.

The microcapillaries 102 may be lined with an insulating material. The purpose of this would be to electrically insulate the silicon substrate 101 from the electrodes.

Figure 2B:
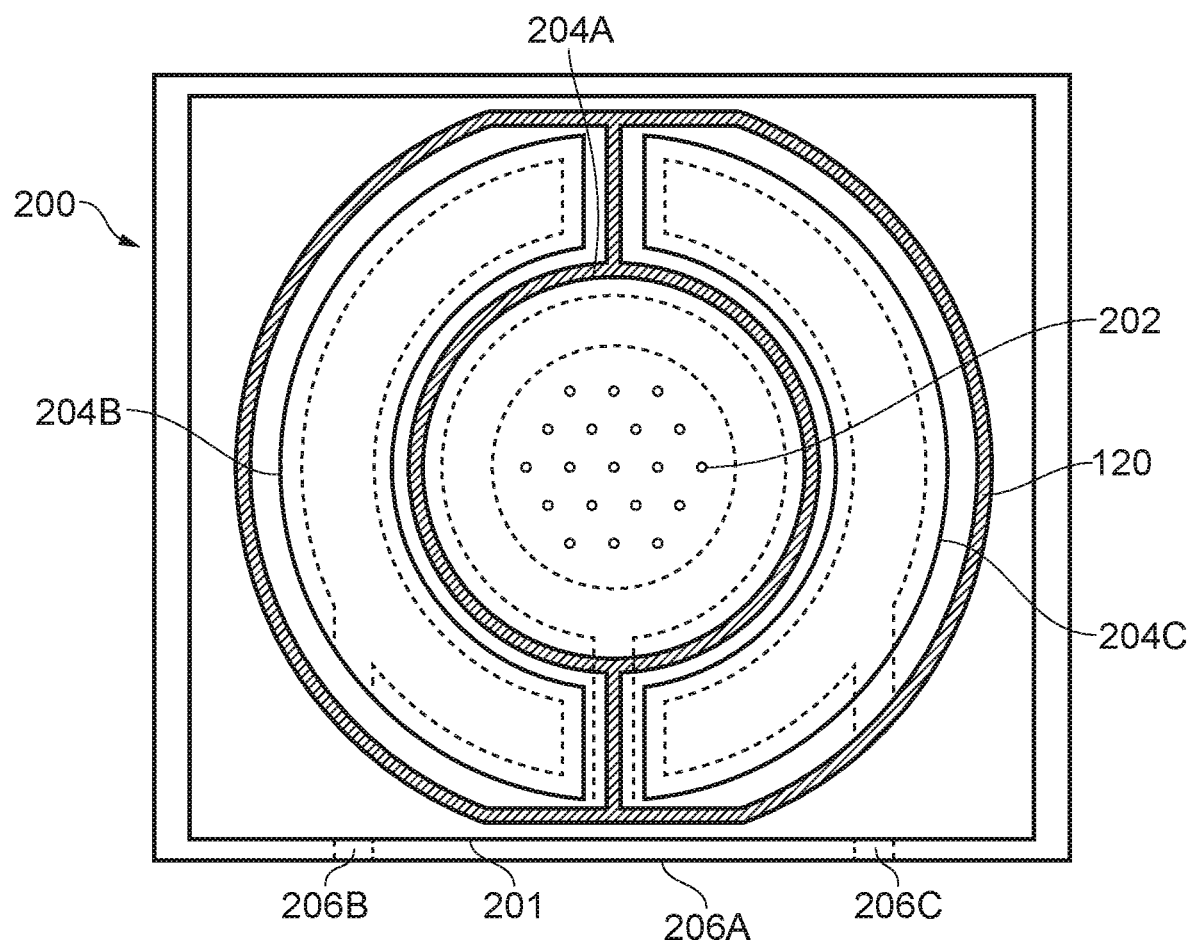
FIG. 2B is a plan view of an electrochemical sensor in accordance with another example of the disclosure.

FIG. 2B shows a plan view of an example sensor 200 with the cap 111 and the electrolyte 114 removed for clarity. The configuration of the sensor conductive tracks and electrodes in FIG. 1B slightly differs from that shown in FIG. 2A their shape and arrangement relative to the other sensor components. In FIG. 2B, the sensor 100 also includes conductive tracks 206A, 206B and 206C, The conductive tracks are shown in broken lines, as they are all positioned below the passivation layer. Conductive track 206A is for connecting the working electrode 204A, The conductive track includes a ring-shaped portion, which is located around the capillaries 202, but within the outer edge of the working electrode 204A, The ring-shaped portion is co-axial with the working electrode 204A. A ring-shaped opening is formed in the passivation layer, and is aligned with the ring-shaped portion of the conductive track 206A, in order to allow the working electrode 204A to connect to the conductive track 206A. A rectangular connecting portion of track 206A is formed at the bottom edge of the ring-shaped portion, to provide a connection to external circuitry.

Conductive tracks 206B and 206C are formed partially underneath counter electrode 204B and reference electrode 204C respectively. Each track includes a semi-annular portion which is the same shape as the corresponding electrode, but slight smaller in size. As such, the semi-annular portions fit within the perimeters of their respective electrodes. Openings are provided in the passivation layer to enable the conductive tracks 206B and 206C to connect to the working electrode 204B and reference electrode, respectively. These openings are similar in size and shape to the semi-annular portions of the conductive tracks 205E and 206C. In a similar manner to the conductive track 206A, the conductive tracks 206B and 206C include rectangular portions which extend from an outer edge of the semi-annular portions to provide connections to external circuitry.

The purpose of using a circular and semi-annular arrangement is to reduce and optimise the distance and spacing between the electrodes. This reduces the resistance path between the electrodes, which can affect the sensor performance, including speed of response. For example, in a carbon monoxide sensor, there's ion movement, or transport, between the electrodes in the sensor. Ideally, therefore, the electrodes (including the entire electrode area) should be as close together as possible. Using circular and semi-annular electrodes makes this easier achieve.

As can be seen from FIG. 2B, the barrier 120 is arranged to surround at least one electrode. By providing the barrier 120 outside and surrounding the electrode 110B, the barrier 120 also protects the electrode 110B from the cap of the electrochemical sensor.

The barrier 120 is also shown to be arranged substantially between the electrodes 110A, 110B in order to isolate them from one another. The barrier 120 also allows the use of higher viscosity inks for printing the electrodes since it fully isolates the electrodes 110A, 110B from one another and so they prevent the flow of electrode ink from one electrode to another. As a result, another advantage that the barrier 120 provides is allowing for the electrodes 110A, 110B to be printed closer together than in a device without the barriers, and thus smaller and cheaper sensors can be manufactured.

FIG. 2B shows a sensor with components that have particular relative dimensions. These dimensions may be altered. The length and width of each sensor may be in the range of 1 mm to 10 mm. The overall thickness, including the substrate 101 and the cap 111 may be 1 mm. As such, on a typical 200 mm wafer, in excess of 1000 sensors may be produced.

In use, the sensor would be connected to a micro-controlled measurement system in a manner familiar to those skilled in the art. The sensor output may be continuously monitored and used to determine the concentration of analyte in the environment. The electrode 110A may come into contact with environmental gases via the microcapillaries 102. As the electrode 110A is porous, the environmental gases are able to pass through the electrode to a point where they come into contact with the electrolyte 114. A three-phase junction is therefore formed within the electrode. An advantage of using a printed, solid electrode 110A, is that it prevents or restricts the electrolyte 114 from escaping through the microcapillaries 102 in the substrate 101.

An advantage of the above-described structure is that silicon micromachining techniques can be used in its construction. As such, manufacturing of the sensor is compatible with fabrication techniques used to manufacture integrated circuits. By manufacturing multiple sensors in parallel, variations in the parameters of the sensors are reduced.

A further advantage of using silicon fabrication techniques is that the cost of each device is reduced. This is because each process step is applied to multiple sensors in parallel, so the processing cost per device is small. Additionally, micromachining techniques enable very small devices to be produced. As such, the sensors may be more easily incorporated into handheld devices. Furthermore, the sensors all see the same processing steps at the same time. As such, matching between devices is very good when compared with serially produced devices.

Figure 2C:
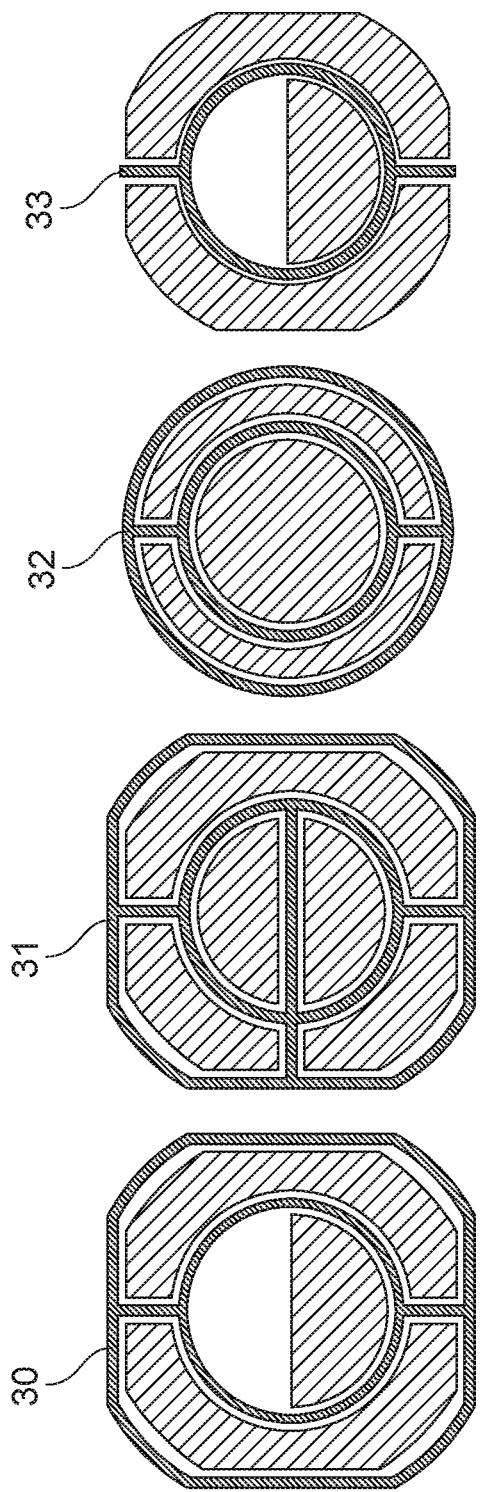
FIG. 2C shows plan views of electrochemical sensors in accordance with other examples of the disclosure.

FIG. 2C shows some further examples of plan views of electrodes of electrochemical sensors in accordance with other examples of the disclosure. In these examples, the barriers are shown in different arrangements to FIG. 2B. However, they still all act to isolate at least part of one electrode from part of another electrode, whether that is by surrounding an electrode and/or by being arranged substantially between two electrodes.

FIGS. 3 to 7 show alternative examples of the disclosure to FIG. 2A and like components with FIG. 2A are labelled with like reference numerals. Technical effects and advantages associated with like components of FIG. 2A may therefore also apply to FIGS. 3 to 7.

Figure 3:
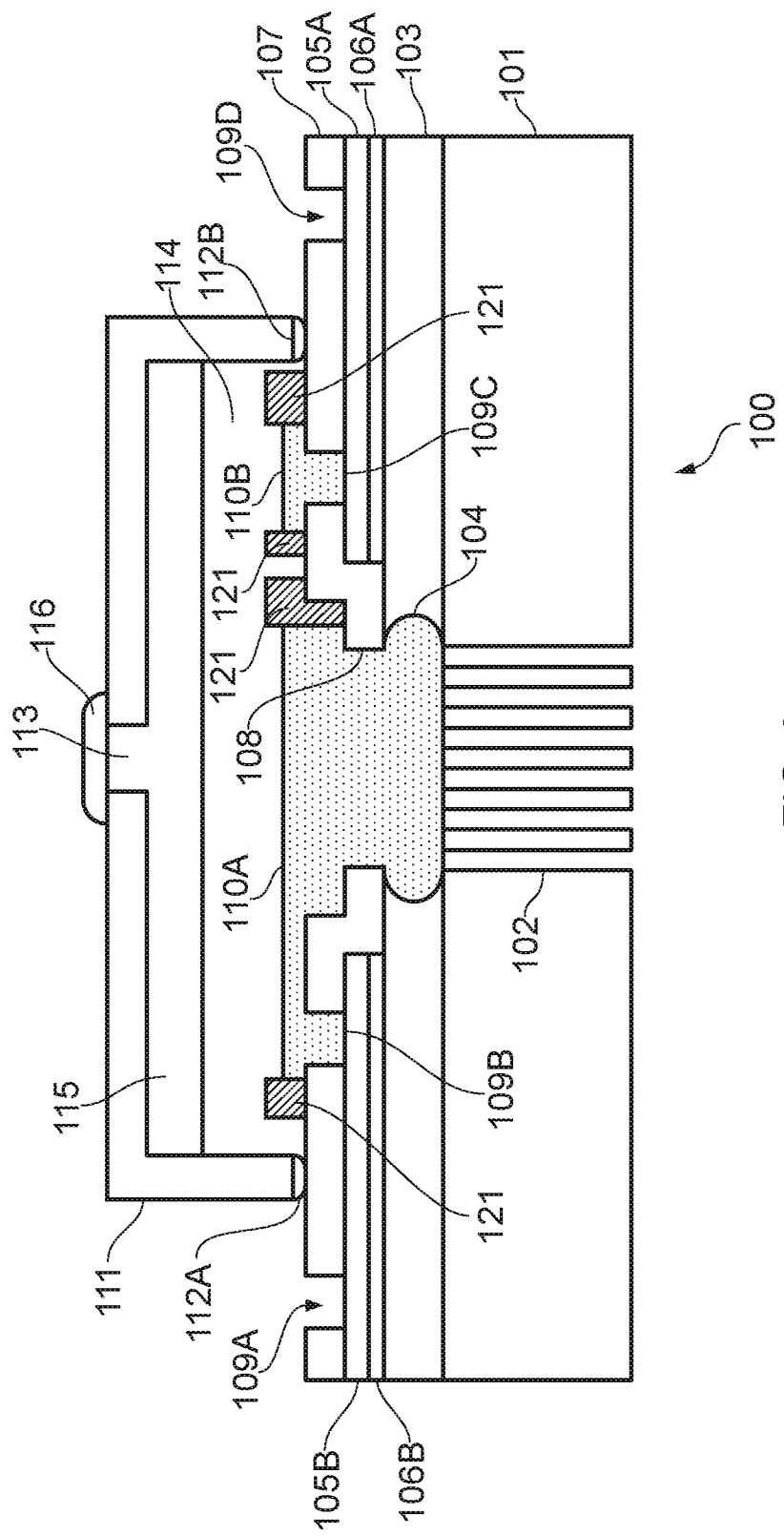
FIG. 3 is a cross-sectional view of an electrochemical sensor in accordance with a second example of the disclosure.

FIG. 3 shows a cross-section through an electrochemical sensor 100 formed on silicon using micromachining techniques in accordance with a second example of the disclosure.

In FIG. 3, the difference compared with FIG. 2 is that the barrier 121 extends beyond the height of the electrodes 110A, 110B. The maximum height of the barrier 121 is about twice the maximum height of the electrodes 110A, 110B when measured from the plane of the passivation layer 107 and the barrier 121 is 50 µm in height. By using a barrier 121 that has a maximum height that is greater than the maximum height of the electrodes 110A, 110B, the effectiveness of the barrier 121 as a means to isolate the electrodes 110A, 110B from one another is increased.

Figure 4:
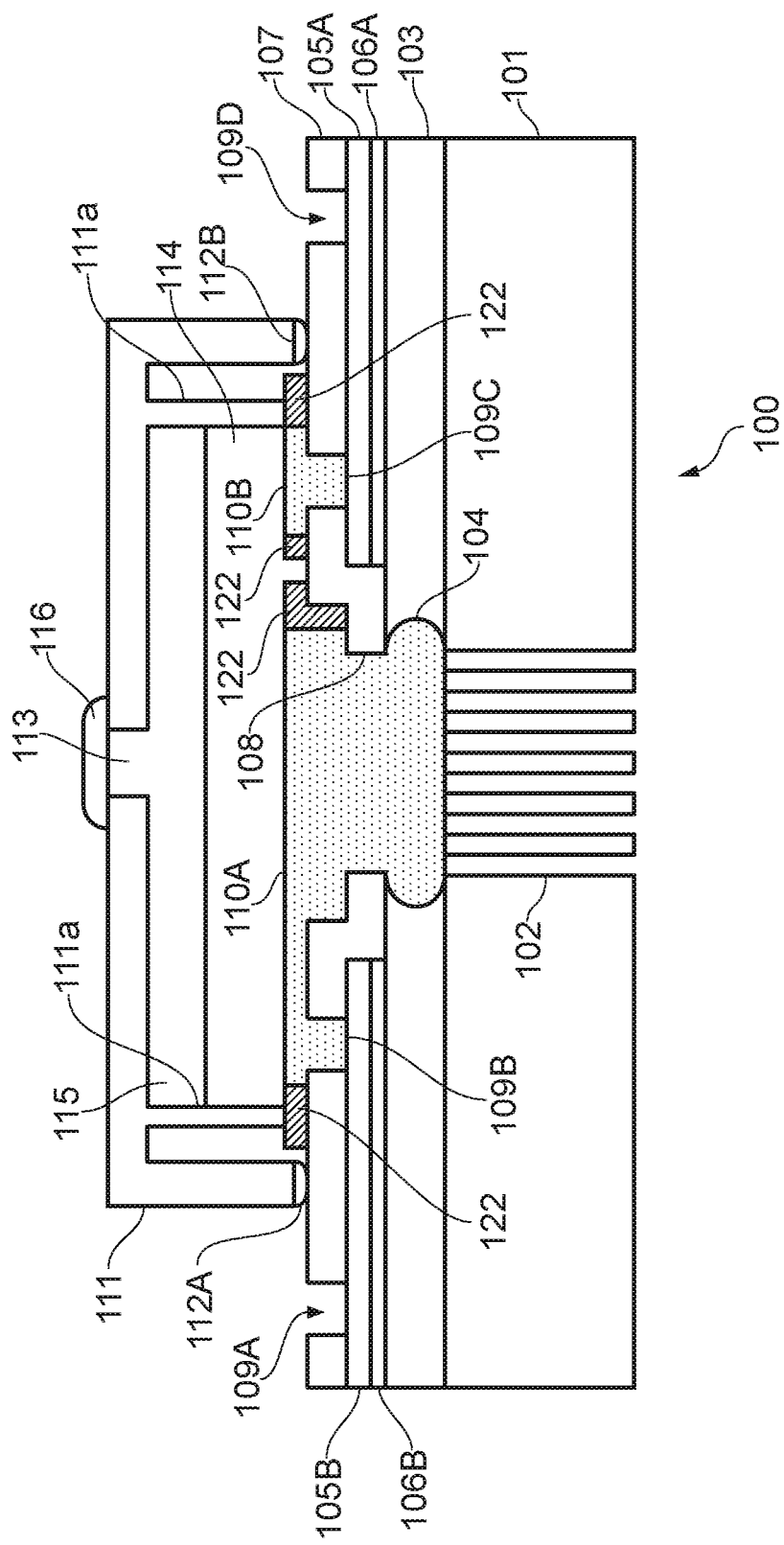
FIG. 4 is a cross-sectional view of an electrochemical sensor in accordance with a third example of the disclosure.

FIG. 4 shows a cross-section through an electrochemical sensor 100 formed on silicon using micromachining techniques in accordance with a second example of the disclosure.

The barrier 122 of FIG. 4 is formed to align with protrusions on the cap 111 of the electrochemical sensor 100 such that, in use, the barrier 122 also acts to contain or house the electrolyte 114. An advantage of this arrangement is that the barrier also confines the electrolyte over the catalyst. This could reduce or eliminate the need for a wicking material for keeping the catalyst in contact with the electrolyte.

Figure 5:
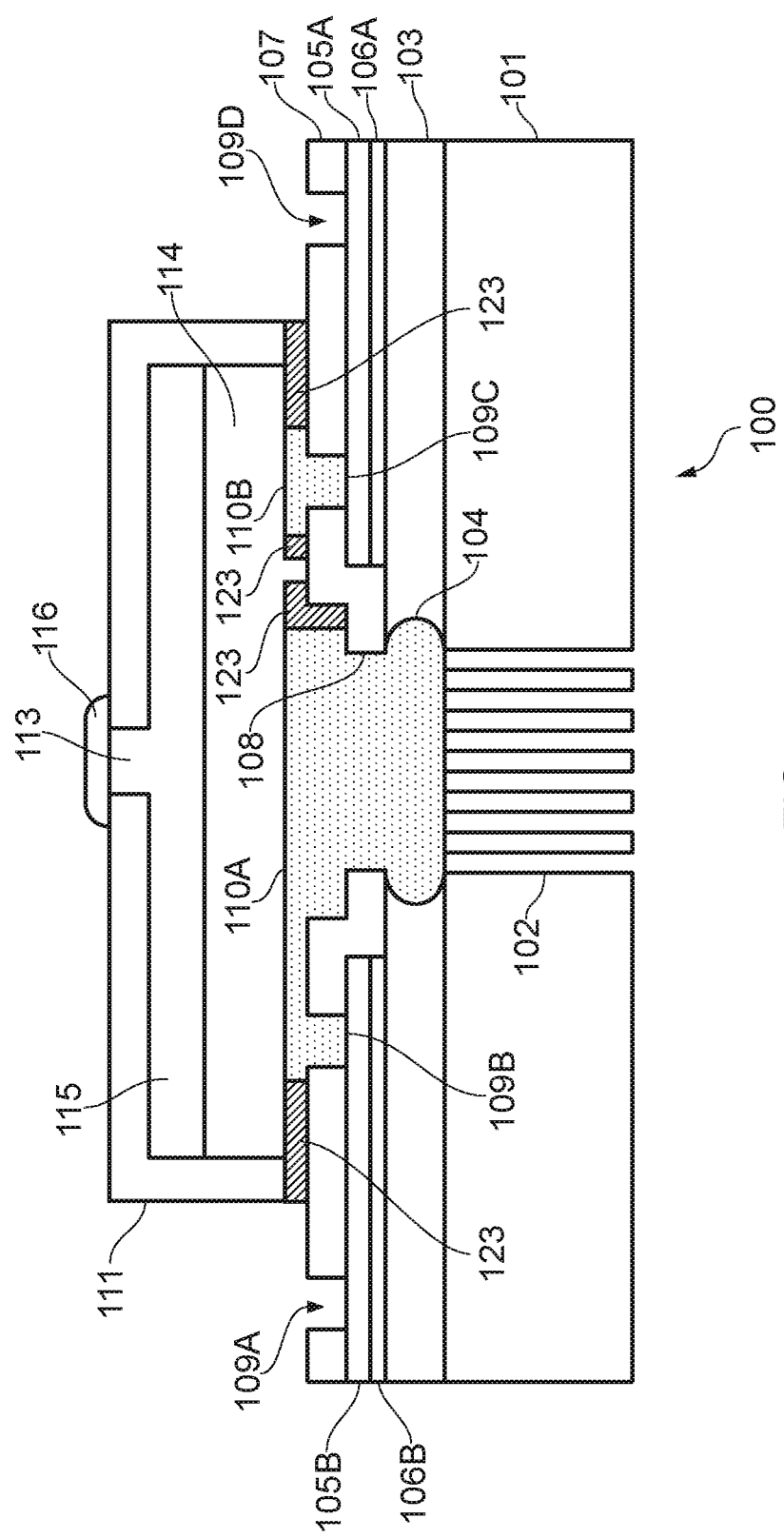
FIG. 5 is a cross-sectional view of an electrochemical sensor in accordance with a fourth example of the disclosure.

FIG. 5 shows a cross-section through an electrochemical sensor 100 formed on silicon using micromachining techniques in accordance with a second example of the disclosure.

When the barrier 123 is made of an adhesive or a bonding material, as is the case in FIG. 5, it is also used to attach the cap 111 to the upper surface of the passivation layer 107. Therefore, there is no need for the epoxy/adhesive or frit glass 112A, 112B of FIG. 2A. By doing this, the number of processing steps are reduced, i.e. by removing the separate adhesive step, which has the benefit of lowering the processing cost.

Figure 6:
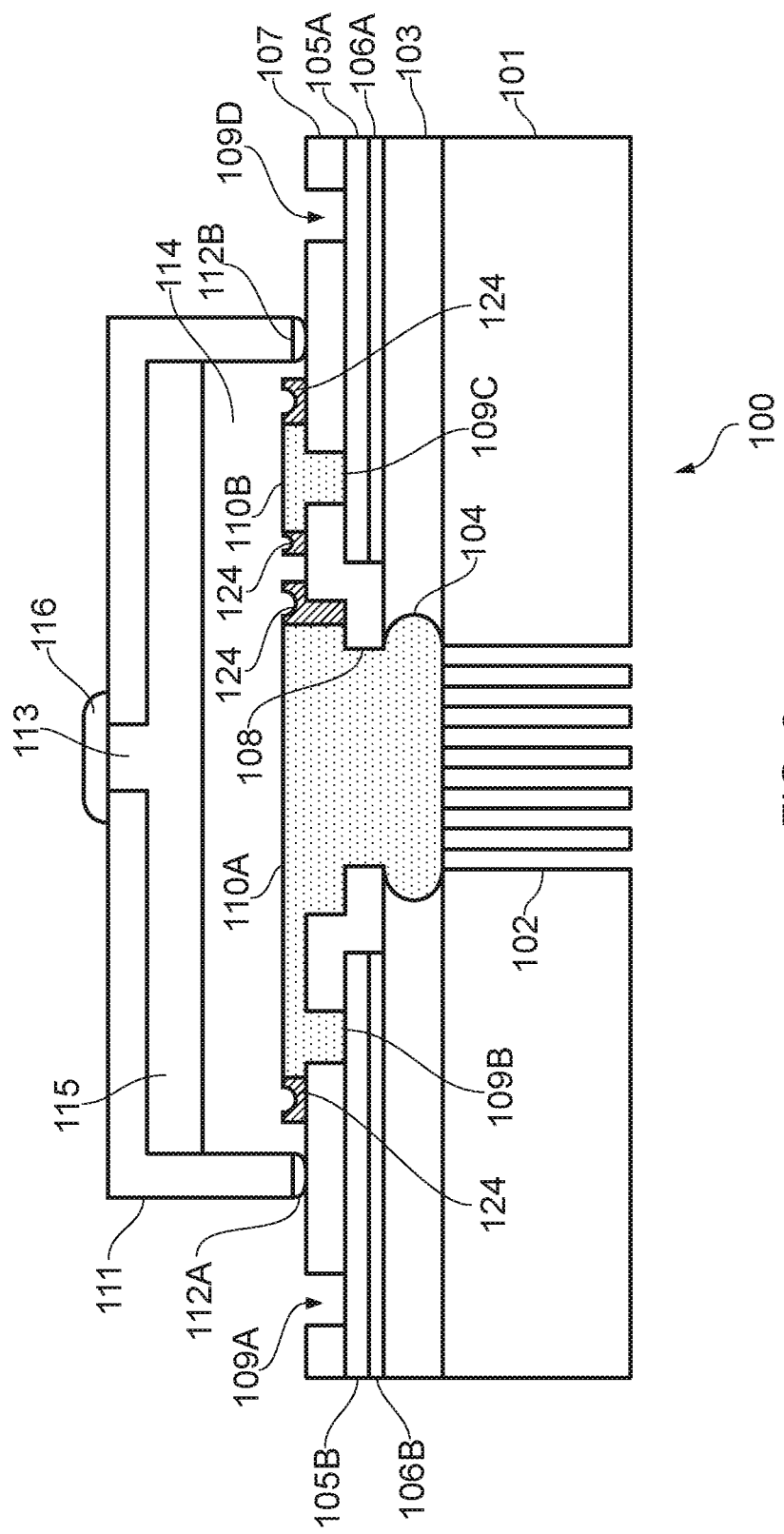
FIG. 6 is a cross-sectional view of an electrochemical sensor in accordance with a fifth example of the disclosure.

FIG. 6 shows a cross-section through an electrochemical sensor 100 formed on silicon using micromachining techniques in accordance with a second example of the disclosure.

For further robustness, in FIG. 6, the barrier 124 are configured to be well-shaped, having two peaks enclosing a dip. The two peaks are preferably spaced apart by at least 0.02 millimetres. The barrier 124 is effectively double-walled. Therefore, in the event that a part of one electrode overflows over an inner wall of the barrier 124, it may reside between the two walls of the barrier 124, i.e. in the dip, and is prevented from flowing over the outer wall of the barrier 124.

Figure 7:
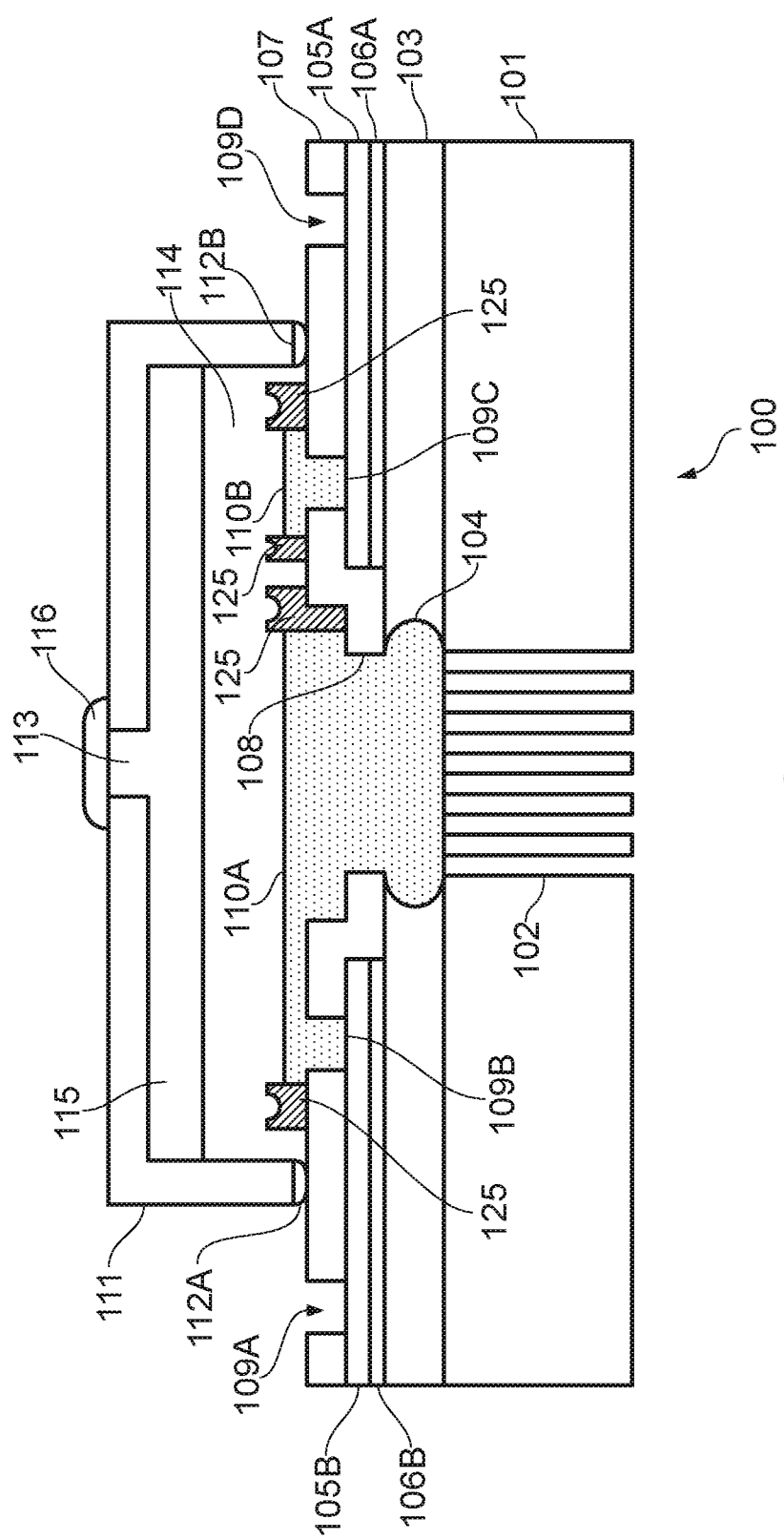
FIG. 7 is a cross-sectional view of an electrochemical sensor in accordance with a sixth example of the disclosure.

FIG. 7 shows a cross-section through an electrochemical sensor 100 formed on silicon using micromachining techniques in accordance with a second example of the disclosure.

The barrier 125 of FIG. 7 combines the advantages of the barrier 121 of FIG. 3 and the barrier 124 FIG. 6, i.e. it has a maximum height of double the maximum height of the electrodes 110A, 110E when measuring from the plane of the passivation layer 107, and it also is double-walled. Therefore, in order for contact between the electrodes 110A, 110B to occur, the first hurdle that the electrode ink must overcome is to spill over a barrier 125 that has a maximum height of twice the maximum height of the electrodes 110A, 110E when measured from the plane of the passivation layer 107. By using a barrier 125 that has a maximum height that is greater than the maximum height of the electrodes 110A, 110B, the effectiveness of the barrier 125 as a means to isolate the electrodes 110A, 110B from one another is already increased. Further, the second hurdle is, even if a part of one electrode overflows over an inner wall of the barrier 125, it may reside between the two walls of the barrier 125, i.e. in the dip, and is prevented from flowing over the outer wall of the barrier 125. A lowest height of the dip, as shown in FIG. 6, is equal to the maximum height of the two electrodes 110A, 110B, for effective containment of any electrode ink that overspills into the dip. Together, the aggregate effect of the barrier 125 is a particularly robust and reliable means to isolate the electrodes 110A, 110E of the electrochemical sensor 100.

A method of fabricating the electrochemical sensor 100 will now be described with reference to FIGS. 8A to 8J.

Figure 8A:
FIG. 8A schematically illustrates a substrate at an initial phase of a fabrication process for the electrochemical sensor shown in FIGS. 7A and 7B.

FIG. 8A shows the first step in the fabrication process. A silicon wafer is used as the silicon substrate 101. In the following, the process for forming one device will be described, however several hundred devices may be formed in parallel on the same wafer. The silicon substrate 101 is used for mechanical support, and could be substituted for another type of material, such as glass.

Figure 8B:
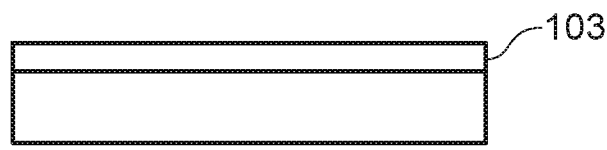
FIG. 8B shows the substrate after formation of an insulating layer.

An oxide insulating layer 103 is deposited on the wafer, as shown in FIG. 8B. The oxide layer serves as a "landing" oxide to stop the through wafer etch, and also serves as a layer to insulate the conductive tracks from the substrate to prevent shorting.

Figure 8C:
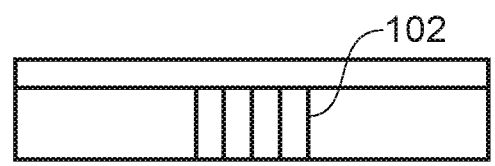
FIG. 8C shows the substrate after formation of microcapillaries.

The microcapillaries 102 are defined in the wafer by photolithography. The microcapillaries are etched through the wafer using an isotropic dry etch. They are etched from the backside of the wafer and stop at the oxide layer once the silicon wafer has been etched through, as shown in FIG. 8C.

Figure 8D:
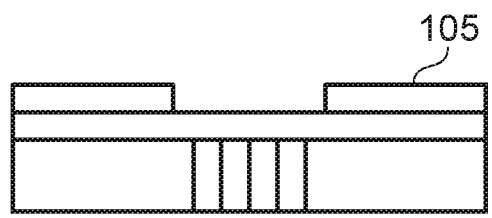
FIG. 8D shows the substrate after formation of a metal layer.

FIG. 8D shows formation of inert metal layers which form the conducting tracks 105. They are deposited on the insulation layer, on the front side of the wafer.

An adhesive layer 106 is first deposited on the insulating layer 103, and is used to attach the metal layer to the insulating layer 103. The conductive tracks may be defined by photolithography and then etched. The thickness of the inert metal can be increased by electroplating in specific areas, as defined by photolithography.

Figure 8E:
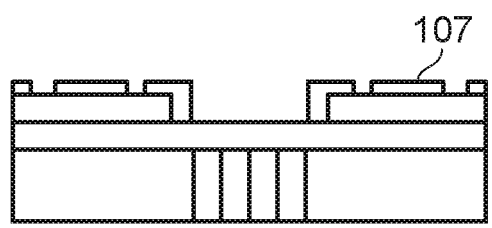
FIG. 8E shows the substrate after deposition and definition of the passivation layer.
Figure 8F:
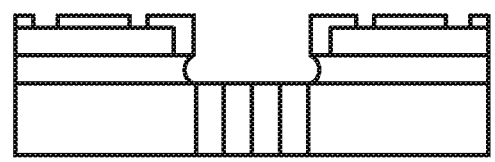
FIG. 8F shows the substrate after removal of a portion of the insulating layer.

FIG. 8E shows the sensor after deposition and definition of the passivation layer 107. The insulating oxide 103 on the front side of the wafer 101 is removed in the region of the microcapillaries 102 using a wet etch, as shown in FIG. 8F.

Figure 8G:
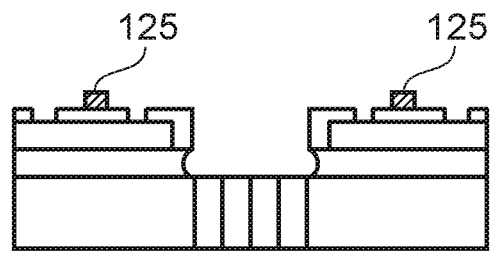
FIG. 8G shows the substrate after forming the barrier.

In FIG. 8G, a barrier 125 is deposited on the upper surface of the passivation layer in a pattern by photolithography in an additive process. The barrier 125 is a double-walled barrier, wherein the dip between the two peaks occurs naturally when baking a polymer barrier and can be further etched in order to optimise the shape of the dip. Barrier 125 creates a stencil for the deposition of electrodes in the next step.

Although not shown in FIG. 8G, an alternative to creating the barrier in an additive process, the barrier could be formed by a removal process, for example, etching the passivation layer such that the resulting patterned passivation layer forms the barrier.

Figure 8H:
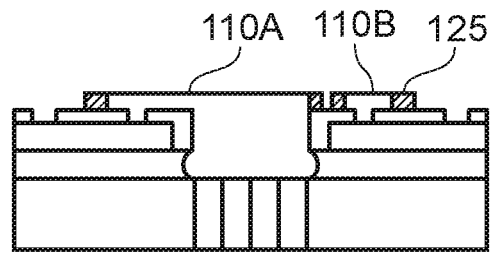
FIG. 8H shows the substrate after deposition of electrodes.

A porous electrode material is deposited on the wafer using screen printing, stencil printing, electroplating, or other lithographic deposition techniques to form electrodes 110A and 110B as shown in FIG. 8H. Electrode 110A covers the microcapillaries 102, and connection is made to the conductive tracks. Electrodes 110A and 110B both sit within the barrier 125. Therefore, the electrodes 110A and 110B are isolated from one another and prevented from contacting one another.

Figure 8I:
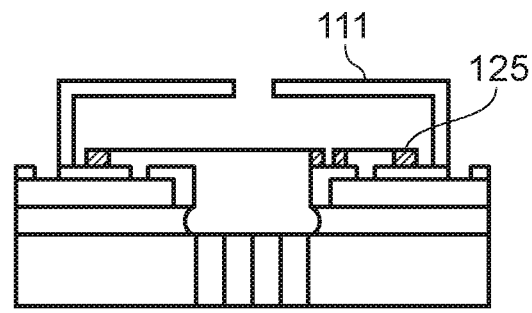
FIG. 8I shows the substrate after application of a cap.

The cap 111 is then placed over the sensor 100, as shown in FIG. 8I. As described above, the cap 111 may be made of plastic, ceramic, silicon or glass, amongst other materials. If the cap is made of plastic, it is typically prefabricated by injection molding, or mold casting if using PDMS, etc. The cap is coated on its inner surface with a hydrophobic layers 203, 204, which repel any electrolyte that is filled in the cavity. The recess and holes may be formed during the injection molding process. If the cap is made from glass, silicon or ceramic, the cap would typically be fabricated using wafer level processing techniques. For glass or ceramic caps, cavities can be made in the cap by firstly using photolithography to pattern the cap cavity. Then one of, or a combination of, wet etching, dry etching, sand blasting and laser drilling may be used to create the cavities in the cap. For silicon caps, cavities can be made in the cap by firstly using photolithography to pattern the cap cavity. Then one of, or a combination of, wet etching, dry etching, sand blasting, and laser drilling may be used to create the cavities in the cap.

Figure 8J:
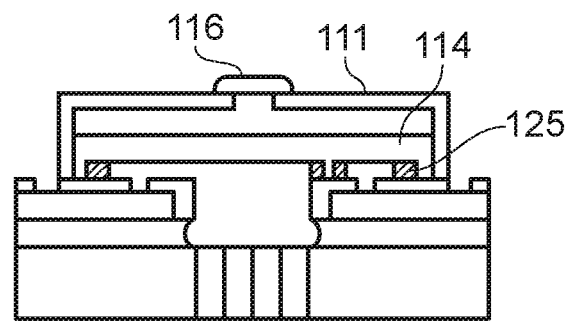
FIG. 8J shows the substrate after insertion of an electrolyte and sealing of the cap.

The cap 111 is attached to the wafer through wafer bonding (wafer processing) or through placement with epoxy/adhesive on the sensor wafer (single cap placement process). Alternatively, the cap 111 may be attached by other means such as ultrasonics. The electrolyte 114 is dispensed through the cap hole 113 and the hole is sealed, as shown in FIG. 8J. As noted above, the cap 111 may have more than one hole.

Figure 9:
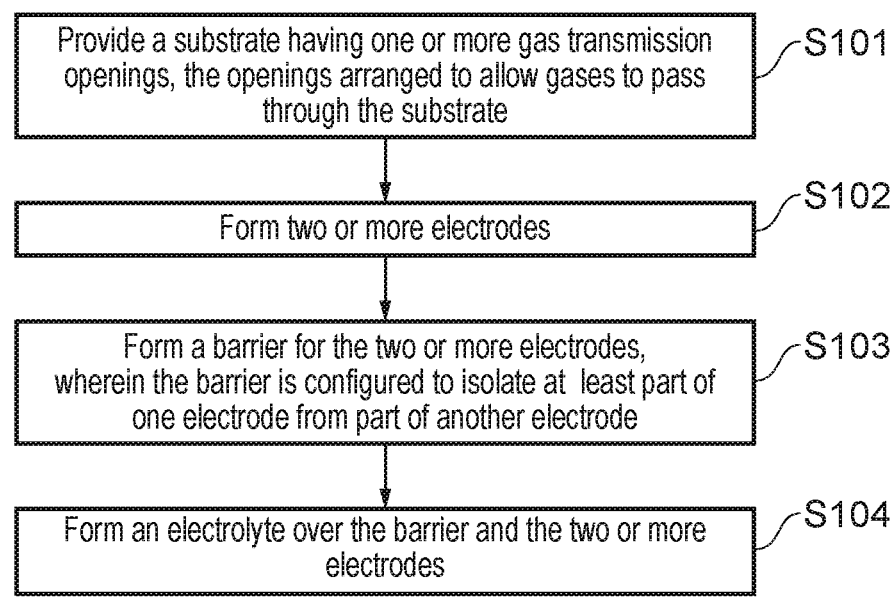
FIG. 9 is a flow diagram showing the steps in a method in accordance with another example of the disclosure.

FIG. 9 is a flow diagram illustrating various steps in a method of manufacturing an electrochemical sensor according to an example of the disclosure. The method initially involves, at step S101, providing a substrate having one or more gas transmission openings, the openings arranged to allow gases to pass through the substrate. Then, at step S102, two or more electrodes are formed. Then, at step S103, a barrier is formed for the two or more electrodes, wherein the barrier is configured to isolate at least part of one electrode from part of another electrode. Finally, at step S104, an electrolyte is formed over the barrier and the two or more electrodes.

Figure 10:
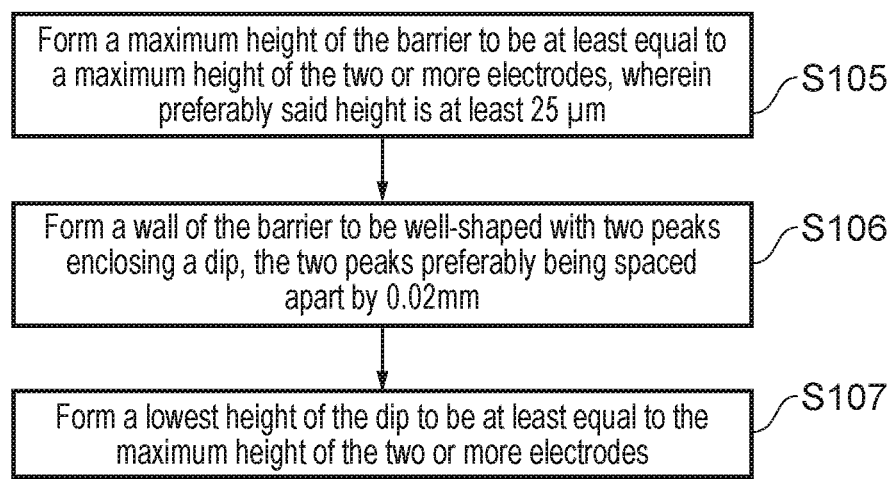
FIG. 10 is a flow diagram showing options for additional steps in a method in accordance with yet another example of the disclosure.

FIG. 10 is a flow diagram illustrating various options for additional steps in the method, in particular, for forming the barrier. At step S105, a maximum height of the barrier is formed to be at least equal to a maximum height of the two or more electrodes, wherein preferably said height is at least 25 μm. At step S106, in order to create a double-walled barrier, a wall of the barrier is formed to be well-shapes with two peaks enclosing a dip, the two peaks preferably being spaced apart by at least 0.02 millimetres. At step S107, a lowest height is formed to be at least equal to the maximum height of the two or more electrodes. Steps S105, S106 and S107 result in an electrochemical sensor that is particularly robust and effective in isolating two or more electrodes from one another and preventing contact between two electrodes.

Figure 11:
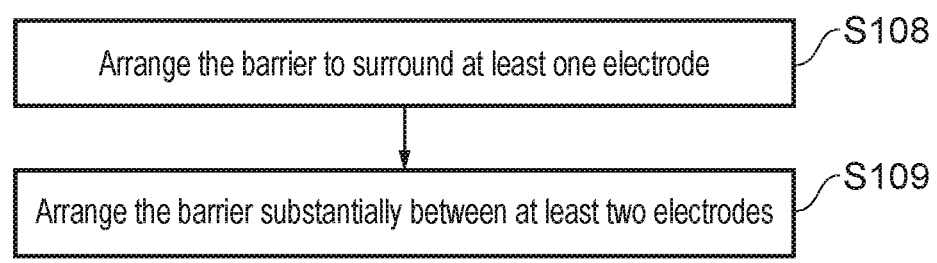
FIG. 11 is a flow diagram showing options for additional steps in a method in accordance with yet another example of the disclosure.

FIG. 11 is a flow diagram illustrating further options for additional steps in the method, in particular, for arranging the barrier relative to the electrodes. In step S108, the barrier is arranged to surround at least one electrode. Sometimes, the barrier may be arranged to surround and outline each part of the electrode. At step 109, the barrier is arranged to be substantially between at least two electrodes. Sometimes, the barrier is arranged between the electrodes so as to fully isolate each part of the two electrodes from one another.

In each of the above-mentioned examples of the disclosure, the electrochemical sensors are shown in a horizontal orientation. It will be appreciated that, in use, the electrochemical sensors may be arranged in a non-horizontal orientation, for example, in a vertical orientation or at an angle to the horizontal orientation shown in the Figures.

The above description relates to particularly preferred aspects of the disclosure, but it will be appreciated that other implementations are possible. Variations and modifications will be apparent to the skilled person, such as equivalent and other features which are already known and which may be used instead of, or in addition to, features described herein. Features that are described in the context of separate aspects or examples may be provided in combination in a single aspect or example. Conversely, features which are described in the context of a single aspect or example may also be provided separately or in any suitable sub-combination.

The present disclosure had been described in the context of an electrochemical sensor. However, it will be appreciated that the principals of using a barrier may also be applied to other microelectromechanical systems. Furthermore, microfluidic devices may also benefit from use of the barrier of the present disclosure.

The invention claimed is:

1. An electrochemical sensor, comprising:
    a substrate having one or more gas transmission openings formed therein, the openings arranged to allow gases to pass through the substrate;
    two or more electrodes;
    a barrier for the two or more electrodes, wherein the barrier is at least 25 μm in height; and
    an electrolyte formed over the barrier and the two or more electrodes,
    wherein the barrier is configured to isolate at least part of one electrode from part of another electrode.

2. An electrochemical sensor according to claim 1, wherein a maximum height of the barrier is at least twice the maximum height of the two or more electrodes.

3. An electrochemical sensor according to claim 1, wherein a wall of the barrier is well-shaped and has two peaks enclosing a dip.

4. An electrochemical sensor according to claim 3, wherein a lowest height of the dip is at least equal to a maximum height of the two or more electrodes.

5. An electrochemical sensor according to claim 1, wherein the electrochemical sensor further comprises an upper insulating layer having one or more openings configured to receive the two or more electrodes.

6. An electrochemical sensor according to claim 5, wherein the barrier is arranged over the upper insulating layer.

7. An electrochemical sensor according to claim 6, wherein the upper insulating layer is a passivation layer.

8. An electrochemical sensor according to claim 6, wherein the barrier is configured to also receive the two or more electrodes, such that two or more electrodes are at least partly defined by the barrier.

9. An electrochemical sensor according to claim 1, wherein the barrier acts as a stencil for forming the two or more electrodes.

10. An electrochemical sensor according to claim 1, wherein the barrier is arranged to surround at least one electrode.

11. An electrochemical sensor according to any claim 1, wherein the barrier is arranged substantially between at least two electrodes.

12. An electrochemical sensor according to claim 1, wherein the electrochemical sensor further comprises a passivation layer and the barrier is formed over the passivation layer.

13. An electrochemical sensor, comprising:
    a substrate having one or more gas transmission openings formed therein, the openings arranged to allow gases to pass through the substrate;
    two or more electrodes formed in a pattern over an upper surface of the substrate of the electrochemical sensor;
    one or more protrusions formed over the upper surface of the substrate of the electrochemical sensor and formed at least between the two or more electrodes;
    an electrolyte formed over the two or more electrodes, wherein the one or more protrusions are configured to act as barriers to prevent the two or more electrodes from contacting one another, wherein the barriers are at least 25 µm in height.

14. A method of forming an electrochemical sensor, the method comprising steps of:
providing a substrate having one or more gas transmission openings, the openings arranged to allow gases to pass through the substrate;
forming a barrier for two or more electrodes, wherein forming the barrier comprises forming the barrier using etching in a removal process;
forming the two or more electrodes;
forming an electrolyte over the barrier and the two or more electrodes,
wherein the barrier is configured to isolate at least part of one electrode from part of another electrode.

15. A method according to claim 14, wherein forming the barrier comprises forming the barrier using photolithography, lamination or deposition in an additive process.

16. A method according to claim 14, wherein the method further comprises forming an upper insulating layer having one or more openings configured to receive the two or more electrodes.

17. A method according to claim 16, wherein forming the barrier comprises arranging the barrier over the upper insulating layer.

18. A method according to claim 17, wherein forming the barrier comprises configuring the barrier to also receive the two or more electrodes, such that two or more electrodes are at least partly defined by the barrier.

19. An electrochemical sensor, comprising:
a substrate having one or more gas transmission openings formed therein, the openings arranged to allow gases to pass through the substrate;
two or more electrodes;
a barrier for the two or more electrodes, wherein the barrier acts as a stencil for forming the two or more electrodes; and
an electrolyte formed over the barrier and the two or more electrodes,
wherein the barrier is configured to isolate at least part of one electrode from part of another electrode.

20. A method of forming an electrochemical sensor, the method comprising steps of:
providing a substrate having one or more gas transmission openings, the openings arranged to allow gases to pass through the substrate;
forming a barrier for two or more electrodes, wherein forming the barrier comprises configuring the barrier to also receive the two or more electrodes, such that two or more electrodes are at least partly defined by the barrier;
forming the two or more electrodes;
forming an electrolyte over the barrier and the two or more electrodes,
wherein the barrier is configured to isolate at least part of one electrode from part of another electrode.

* * * * *